(12) United States Patent
Cho et al.

(10) Patent No.: US 12,064,837 B2
(45) Date of Patent: Aug. 20, 2024

(54) METHOD FOR MANUFACTURING KITCHEN KNIFE BY USING MULTILAYER MATERIAL

(71) Applicant: KONGJU NATIONAL UNIVERSITY INDUSTRY-UNIVERSITY COOPERATION FOUNDATION, Gongju-si (KR)

(72) Inventors: Nam Chul Cho, Gongju-si (KR); Jeong Wook Han, Seoul (KR); Sung Mo Cho, Ulsan (KR)

(73) Assignee: Kongju National University Industry—University Cooperation Foundation, Gongju-si (KR)

( * ) Notice: Subject to any disclaimer, the term of this patent is extended or adjusted under 35 U.S.C. 154(b) by 870 days.

(21) Appl. No.: 17/107,120

(22) Filed: Nov. 30, 2020

(65) Prior Publication Data
US 2021/0094132 A1    Apr. 1, 2021

Related U.S. Application Data

(63) Continuation of application No. PCT/KR2018/012030, filed on Oct. 12, 2018.

(30) Foreign Application Priority Data

May 31, 2018    (KR) .................. 10-2018-0062886

(51) Int. Cl.
*B23P 15/40*    (2006.01)
*B21J 5/12*    (2006.01)
(Continued)

(52) U.S. Cl.
CPC .............. *B23P 15/40* (2013.01); *B21J 5/12* (2013.01); *B21K 11/02* (2013.01); *B24B 3/54* (2013.01);
(Continued)

(58) Field of Classification Search
CPC . B23P 15/40; B21K 11/02; B26B 3/02; B26B 9/00; B24B 3/54; B21J 5/12;
(Continued)

(56) References Cited

U.S. PATENT DOCUMENTS 3,280,614 A * 10/1966 Cordray et al. ........ B21B 1/227
29/DIG. 30
3,465,419 A *  9/1969 Keenan et al. ....... B32B 15/018
228/160
(Continued)

FOREIGN PATENT DOCUMENTS

JP    H10-296548 A    11/1998
JP    2002-361443 A    12/2002
(Continued)

OTHER PUBLICATIONS

International Search Report and Written Opinion mailed Feb. 27, 2019 in International Application No. PCT/KR2018/012030, in 10 pages. (*English translation of ISR.*).

*Primary Examiner* — Jason Daniel Prone
(74) *Attorney, Agent, or Firm* — Knobbe, Martens, Olson & Bear, LLP

(57) ABSTRACT

This application relates to a method of manufacturing a knife using a multilayer material. In one aspect, the method includes preparing a multilayer material for manufacturing a knife, and heating and then forging the multilayer material to form a knife-shaped structure including a blade part and a handle part. The method also includes grinding the blade part to form a sharpened knife-edge and applying mud, including kaolin and white clay, to an entire surface of the knife-shaped structure and removing the mud applied to the blade part. The method further includes heating the knife-shaped structure applied with the mud, and quenching the heated knife-shaped structure through oil-cooling. The method further includes etching a surface of the quenched (Continued)

knife-shaped structure to form a pattern on the surface and grinding the surface-etched knife-shaped structure to form a knife having a final shape.

7 Claims, 12 Drawing Sheets

(51) Int. Cl.
| | |
|---|---|
| *B21K 11/02* | (2006.01) |
| *B24B 3/54* | (2006.01) |
| *B26B 3/02* | (2006.01) |
| *C21D 9/18* | (2006.01) |
| *C23F 1/02* | (2006.01) |
| *C23F 1/14* | (2006.01) |
| *C21D 1/58* | (2006.01) |

(52) U.S. Cl.
CPC .................. *B26B 3/02* (2013.01); *C21D 9/18* (2013.01); *C23F 1/02* (2013.01); *C23F 1/14* (2013.01); *C21D 1/58* (2013.01)

(58) Field of Classification Search
CPC .... C21B 3/04; C21B 5/00; C21D 9/18; C22B 1/00; C22C 29/12; C23F 1/02; C23F 1/14
See application file for complete search history.

(56) References Cited

U.S. PATENT DOCUMENTS

| | | | | |
|---|---|---|---|---|
| 3,574,937 | A * | 4/1971 | Wolfe | B26B 9/00 30/355 |
| 4,399,611 | A * | 8/1983 | Maringer | B26B 9/00 76/104.1 |
| 5,185,044 | A * | 2/1993 | Verhoeven | C21D 7/13 148/543 |
| 5,815,790 | A * | 9/1998 | Billgren | B21J 1/00 419/5 |
| 6,422,110 | B1 * | 7/2002 | Wurst | B26B 9/00 76/104.1 |
| 7,431,854 | B2 * | 10/2008 | Lee | B23P 15/40 216/11 |
| 8,137,819 | B2 * | 3/2012 | Koseki | C21D 9/46 228/235.3 |
| 10,350,770 | B1 * | 7/2019 | Chen | B26B 9/00 |
| 11,446,736 | B2 * | 9/2022 | Jarbelius | B21J 1/00 |
| 2020/0030998 | A1 * | 1/2020 | Dawes, III | B26B 9/00 |
| 2023/0381985 | A1 * | 11/2023 | Albert | B26B 9/00 |

FOREIGN PATENT DOCUMENTS

| | | | |
|---|---|---|---|
| JP | 2005-095359 A | 4/2005 | |
| JP | 2011-212226 A | 10/2011 | |
| JP | 5108160 B2 | 12/2012 | |
| KR | 10-0953360 B1 | 4/2010 | |
| KR | 10-1549101 B1 | 9/2015 | |
| KR | 10-1746837 B1 | 6/2017 | |
| WO | WO-2019231058 A1 * | 12/2019 | ............... B21J 5/12 |

* cited by examiner

METHOD FOR MANUFACTURING KITCHEN KNIFE BY USING MULTILAYER MATERIAL

CROSS-REFERENCE TO RELATED APPLICATIONS

This application is a continuation application, and claims the benefit under 35 U.S.C. § 120 and § 365 of PCT Application No. PCT/KR2018/012030 filed on Oct. 12, 2018, which claims priority to Korean Patent Application No. 10-2018-0062886 fled on May 31, 2018, both of which are hereby incorporated by reference.

BACKGROUND

Technical Field

The present disclosure relates to a method of manufacturing a knife that can be used as a kitchen knife or the like, and a knife manufactured thereby. More particularly, the present disclosure relates to a method of manufacturing a knife using a multilayer material such as a material obtained by repeatedly preforming refining and forge-welding processes on an iron sand ingot, and a knife manufactured thereby.

Description of Related Technology

Kitchen knives are essential tools that are used to cut or trim food ingredients such as meat, fish, vegetables, and fruits in the kitchen. The kitchen knives are manufactured in diverse forms according to kinds of food ingredients to be cut, cutting methods, or the like. The kitchen knife essentially includes a handle part to be held by a user, and a blade part fixed on one side to the handle part.

SUMMARY

One aspect is a method of manufacturing a knife that has a remarkably improved hardness compared to the related art, as well as a fine appearance, by using a multilayer material obtained by repeatedly performing refining and forge-welding processes on an iron sand ingot.

Another aspect is a method of manufacturing a knife using a multilayer material the method including: (a) preparing a multilayer material for manufacturing a knife; (b) heating and then forging the multilayer material to form a knife-shaped form (or a knife-shaped structure) including a blade part and a handle part (c) grinding the blade part to form a sharpened knife-edge; (d) applying mud, including kaolin and white clay, to the entire surface of the knife-shaped form and removing the mud applied to the blade part; (e) heating the knife-shaped form applied with the mud, followed by quenching through oil-cooling; (f) etching the surface of the quenched knife-shaped form to form a pattern on the surface; and (g) grinding the surface-etched knife-shaped form to form a knife having a final shape.

The step (a) may include the sub-steps of: [8] (a-1) heating wrought iron obtained by refining iron sand in a smithery hearth; (a-2) forging the wrought iron heated in the step (a-1) to form an iron sand ingot; (a-3) coating the outer surface of the iron sand ingot formed in the step (a-2) with charcoal and red clay; (a-4) heating the iron sand ingots coated in the step (a-3); stacking the iron sand ingots along a longitudinal direction, and forge-welding the stacked iron sand ingots to form forge-welded iron sand ingots; and (a-5) coating the outer surfaces of the forge-welded iron sand ingots with the charcoal and red clay, heating the coated forge-welded iron sand ingots, stacking the forge-welded iron sand ingots along the longitudinal direction, and forge-welding the stacked iron sand ingots, wherein the sub-step (a-5) is performed two or more times.

In the step (a-1), the iron sand may be mainly composed of: 85 wt % to 95 wt % of iron oxide (FeO); 3 wt % to 7 wt % of silica ($SiO_2$); 2 wt % to 4 wt % of aluminum oxide ($Al_2O_3$); 0.1 wt % to 0.5 wt % of calcium oxide (CaO); 0.1 wt % to 0.5 wt % of manganese oxide (MnO); 0.4 wt % to 0.7 wt % of titanium dioxide ($TiO_2$); and 0.2 wt % to 0.5 wt % of vanadium oxide ($V_2O_5$).

The steps (a-4) and (a-5) may be performed in a smithery hearth at 1250° C. In addition, the step (a-5) may be performed 11 times. In the step (d), the mud may be composed of kaolin and white clay in a weight ratio of 1:1. In the step (f), the quenched knife-shaped form may be immersed in an aqueous solution of iron chloride ($FeCl_3$) for etching.

Further, according to another aspect of the present disclosure, there is provided a kitchen knife manufactured by the method using the multilayer material.

According to the present disclosure, the knife is manufactured by performing the processes, such as gorging, grinding, quenching, etching, and the like, on the multilayer material obtained by repeating the refining and forge-welding processes of iron sand ingots from an iron sand source, thereby providing remarkably improved hardness, a long lasting cutting property, and excellent durability, compared to a conventional knife made of stainless steel.

In addition, the knife manufactured using the multilayer material obtained from iron sand according to the present disclosure has a beautiful wave pattern, like a so called a Damascus knife, and also has a beautiful surface obtained by an additional surface etching process to bring out aesthetics to the user.

DETAILED DESCRIPTION

Figure 1A:
FIG. 1A.

Generally, the blade part of a kitchen knife is manufactured using a stainless steel having low hardness, so that the blade part are easily worn even in a relatively short use time, resulting in frequent replacement of the blade part.

In the following description, it is to be noted that, when the functions of conventional elements and the detailed description of elements related with the present invention may make the gist of the present invention unclear, a detailed description of those elements will be omitted.

Since the embodiments according to the concept of the present disclosure may be changed and modified in various forms, specific embodiments will be illustrated in the drawings and described in detail in the present specification or application. However, it should be understood that this is not intended to limit the embodiments according to the concept of the present disclosure to a disclosed specific form, but include all of changes, equivalents, and substitutes falling in the spirit and scope of the present disclosure.

The terminology used herein is for the purpose of describing particular embodiments only and is not intended to limit the invention. As used herein, the singular forms "a", "an", and "the" are intended to include the plural forms as well, unless the context clearly indicates otherwise. It will be further understood that the terms "comprises" and/or "comprising" or "includes" and/or "including", when used in this specification, specify the presence of stated features, integer steps, operations, elements, components, or combinations thereof, but do not preclude the presence or addition of one or more other features, integers, steps, operations, elements, components, or combinations thereof.

In order to solve the technical problem as described above, the present disclosure provides a method of manufacturing a knife using a multilayer material, the method including: (a) preparing a multilayer material for manufacturing a knife; (b) heating and then forging the multilayer material to form a knife-shaped form including a blade part and a handle part; (c) grinding the blade part to form a sharpened knife-edge; (d) applying mud, including kaolin and white clay, to the entire surface of the knife-shaped form and removing the mud applied to the blade pail; (e) heating the knife-shaped form applied with the mud, followed by quenching through oil-cooling (f) etching the surface of the quenched knife-shaped form to form a pattern on the surface; and (g) grinding the surface-etched knife-shaped form to form a knife having a final shape.

Here, the step (a) may include the sub-steps of: (a-1) heating wrought iron obtained by refining iron sand in a smithery hearth; (a-2) forging the wrought iron heated in the step (a-1) to form an iron sand ingot; (a-3) coating the outer surface of the iron sand ingot formed in the step (a-2) with charcoal and red clay; (a-4) heating the iron sand ingots coated in the step (a-3), stacking the iron sand ingots along a longitudinal direction, and forge-welding the stacked iron sand ingots to form forge-welded iron sand ingots; and (a-5) coating the outer surfaces of the forge-welded iron sand ingots with the charcoal and red clay, heating the coated forge-welded iron sand ingots, stacking the forge-welded iron sand ingots along the longitudinal direction, and forge-welding the stacked iron sand ingots, wherein the sub-step (a-5) is performed two or more times.

by repeating the process of refining and forge-welding the iron sand ingot produced using iron sand as a raw material several times as described above, the strength and toughness of the iron sand ingot is increased, and a multilayer material from which impurities and voids have been removed can be manufactured in high yield.

The step (a-1) is a step of heating the wrought iron obtained by refining iron sand in a smithery hearth. As an example, the wrought iron may be obtained by reducing the iron sand while discharging the slag, by alternately introducing the sand iron and the charcoal into the smelting furnace at a weight ratio of about 1:2 to 1:3, burning the charcoal to heat the smelting furnace to about 1300° C. to 1800° C. while injecting air into the smelting furnace through the tuyere. The wrought iron is manufactured by first refining iron sand in the smelting furnace, and it has a porous, non-uniform microstructure, along with many impurities, so the material properties of the wrought iron is not suitable for manufacturing a variety of tools. The wrought iron may be heated into a semi-melted state in the smithery hearth in this step, and then may be refined and forge-welded in a subsequent step to be described later to improve the material properties of the wrought iron. When the wrought iron is heated to a high temperature in the smithery hearth as described above, it can be expected that impurities in the wrought iron are melted and eluted to the outside. Preferably, the wrought iron may be heated to 1250° C. in the smithery hearth.

As described above, charcoal can be used to heat the smithery hearth, wherein the charcoal may preferably be white charcoal formed from pine charcoal with few impurities that has strong thermal power, and the charcoal has slices of split charcoal in shape in order to maintain sufficient high temperature in the smithery hearth.

In addition, the wrought iron may be formed from the iron sand mainly composed of: 85 wt % to 95 wt % of iron oxide (FeO): 3 wt % to 7 wt % of silica ($SiO_2$); 2 wt % to 4 wt % of aluminum oxide ($Al_2O_3$); 0.1 wt % to 0.5 wt % of calcium oxide (CaO); 0.1 wt % to 0.5 wt % of manganese oxide (MnO); 0.4% t % to 0.7 wt % of titanium dioxide ($TiO_2$); and 0.2 wt % to 0.5 wt % of vanadium oxide ($V_2O_5$). The wrought iron produced by primary refining of the iron sand has a structure in which a considerable amount of coarse non-metallic inclusions such as glassy slag exists, the ratio of impurities and voids is 25% or more, the carbon content is not constant, and Widmanstatten as complicatedly entangled coarse crystal gains is present. Accordingly, since the primary smelted wrought iron cannot be a suitable material for making tools, a process of refining the wrought iron is essential.

The step (a-2) is a step of forging the wrought iron heated in the step (a-1), such that the heated wrought iron is forged to a preset length in the longitudinal direction to form an iron sand ingot.

The step (a-3) is a step of coating the outer surface of the iron sand ingot forged in step (a-2) with charcoal and red ay. In this step, charcoal and red clay are coated on the outer surface of the forged iron sand ingot to prevent decarburization occurring in the iron sand ingot during refining and forge-welding processes, thereby preventing softening due to the decarburization. The charcoal may be powder obtained by pulverizing pine charcoal, and red clay water may be used by mixing red clay, white clay, and water in a certain ratio, which is not limited.

The step (a-4) is a step of heating the iron sand ingot coated in step (a-3), stacking the iron sand ingots along the longitudinal direction, and then forge-welding the iron sand ingots. In order to improve the strength of the iron sand ingot having many impurities and voids, the heated iron sand ingots are stacked and forge-welded in the longitudinal direction to remove impurities contained therein, thereby forming a forged iron sand ingot. In this step, the forged iron sand ingot may be formed by a forge-welding process in which the iron sand ingot coated with charcoal and red clay as described above is mechanically beaten or pressed with a hammer, etc., to stretch the iron sand ingot. When the iron sand ingot is continuously pressurized by a mechanical method as described above, impurities may be eluted to the outside of the ingot by pressure, and non-metallic inclusions may be elongated along the forge-welded surfaces, and crystal grains are refined, thereby obtaining the forge-welded iron sand ingot having remarkably improved material properties such as increased strength and toughness along with few impurities and voids. In addition, in this step, it is preferable to heat the iron sand ingot in the smithery hearth at 1250° C. Further, in order to superimpose the above-described iron sand ingot, the ingot may be divided into multiple parts, preferably two or three parts, which are stacked and welded together. Here, the ingot may preferably be divided into two halves and welded. In order to divide the iron sand ingot, a cutting tool such as an axe may be used but is not limited thereto.

In the step (a-5), the outer surface of the iron sand ingot is coated with the charcoal and red clay, the coated iron sand ingot is heated, and then the iron sand ingot is divided into two halves, which are subsequently stacked and forge-welded. The step (a-5) may be performed several times. The greater the number of times the above-described forge-welding process is performed, the finer the crystal grains of the iron sand ingot may become, and the more impurities and voids may decrease. In the present disclosure, the step (a-5) is thus performed several times using the prepared forge-welded iron sand ingot so that the material properties of the forge-welded iron sand ingot may be further improved. The step (a-5) may be configured to perform the forge-welding process 12 or more times by 11 or more times repeating.

In the meantime, in the step (f), the mud may be composed of kaolin and white clay in a weight ratio of 1:1.

In addition, in the step (f), the quenched knife-shaped form may be immersed in an aqueous solution of iron chloride ($FeCl_3$) for etching.

According to the present disclosure, the knife is manufactured by performing the processes, such as gorging, grinding, quenching, etching, and the like, on the multilayer material obtained by repeating the refining and forge-welding processes of iron sand ingots from an iron sand source, thereby providing remarkably improved hardness, a long lasting cutting property, and excellent durability, compared to a conventional knife made of stainless steel.

In addition, the knife manufactured using the multilayer material obtained from iron sand according to the present disclosure has a beautiful wave pattern like so called a Damascus knife, and also has a beautiful surface obtained by an additional surface etching process to bring out aesthetics to the user.

Embodiments of the present disclosure will now be described in detail. The embodiments presented are only specific illustration of the present disclosure and are not intended to limit the scope of the present disclosure.

Preparation of Multilayer Material for Manufacturing Kitchen Knife Through Refining and Fore-Welding of Wrought Iron Ingot In order to use a wrought iron ingot, which is produced by refining iron sand, as an iron product, it is necessary to remove impurities and reduce porosity. At this time, the impurity removal and porosity reduction may be obtained by repeated forge-welding through forging, which means hammering, and repeated refining of continuously heating the wrought iron ingot under high temperature so that the impurities are melted. In addition, it is possible to manufacture a high-strength iron ingot by refinement of microstructure through the forge-welding.

Materials prepared for refining and forge-welding were a mixture of 1.16 kg coal and 1 kg rice straw, a mixture of 1.16 kg red clay and 10.52 kg water, and iron sand. Then, a process in which the wrought iron ingot wad heated in a smithery hearth and then was forged on an anvil was repeated to produce a multilayer material.

The amount of charcoal charged and the repeated number of forging process for refining and forge-welding are shown in Table 1 below. A final iron ingot formed from the multilayer material was obtained by performing the process 12 times in total.

TABLE 1

| | | Number of times forge-welding performed | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| Number of times forging performed | Before forge-welding | 33 | 35 | 30 | 32 | 40 | 30 | 30 | 32 | 34 | 35 | 35 | 30 |
| | After forge-welding | 5 | 5 | 5 | 5 | 7 | 6 | 5 | 5 | 9 | 6 | 8 | 6 |
| | Machine hammering | 100 | 100 | 100 | 100 | 100 | 100 | 100 | 100 | 100 | 100 | 100 | 100 |
| Number of times charcoal charge | | 5 | 5 | 5 | | 55 | 5 | 5 | 5 | 5 | 5 | 5 | 5 |

More specifically, the multilayer material was manufactured through the process of refining and forge-welding the wrought iron ingot as follows.

Initially, charcoal (20 kg) was loaded into a furnace, which was heated to 1250° C. Thereafter, the wrought iron ingot was first loaded into the furnace and the first refining was carried out. The heated wrought iron ingot was unloaded and forged using a hammer and then forged again using a mechanical hammer Thereafter, the forged wrought iron ingot was immerged into red clay water for carburization, then placed and maintained at a place where charcoal and rice straw were mixed to prevent decarburization, and then loaded into the furnace again, into which charcoal was additionally charged. The above process was named as the first cycle. Then such a process was performed 12 times total to fabricate a rectangular iron ingot. Excluding the first cycle, from the second cycle, a process was added in which a groove was made in the center of the heated wrought iron ingot and both sides of the ingot around the groove were forge-welded. Through the above steps, a multilayer material was finally produced.

The ratio of impurities and voids in the material in the process of manufacturing the multilayer material was calculated using the equation shown below. According to the calculation result, it was confirmed that the ratio of impurities and voids in one time forge-welded iron ingot was 26.09%, while the ratio in the 12 times forge-welded ingot was decreased to 1.8%.

Impurities and voids ratio (%)=(Area ($cm^2$) of impurities and voids/total area ($cm^2$) of iron ingot sample)×100

Manufacture of Kitchen Knife Using Multilayer Material Prepared in Item (1)

A kitchen knife was manufactured using the multilayer material prepared in item (1), and the manufacturing process thereof will be described with reference to FIGS. 1A-1H.

Figure 1B:
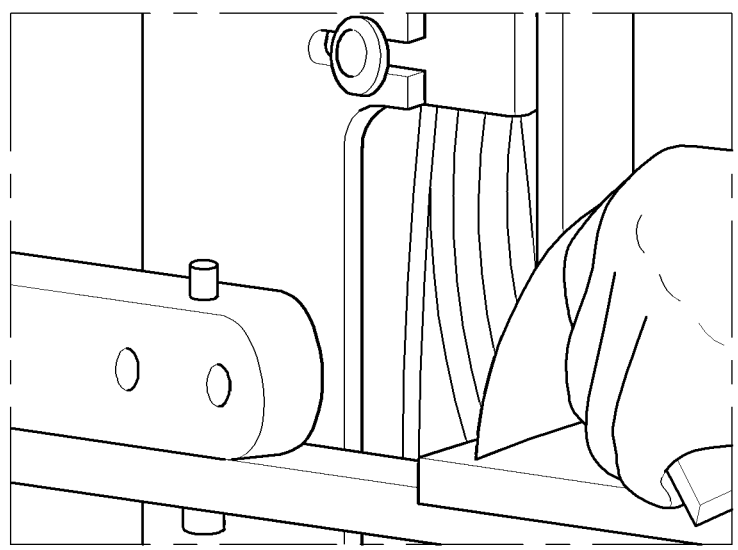
FIG. 1B, FIG. 1C, FIG. 1D.
Figure 1C:
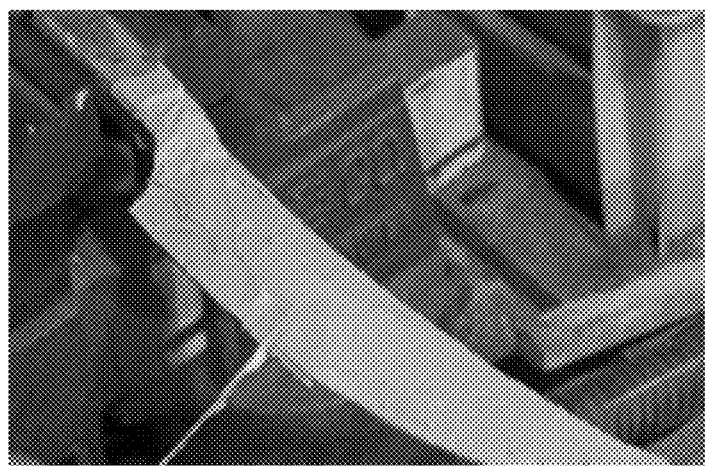
Figure 1D:
Figure 1E:
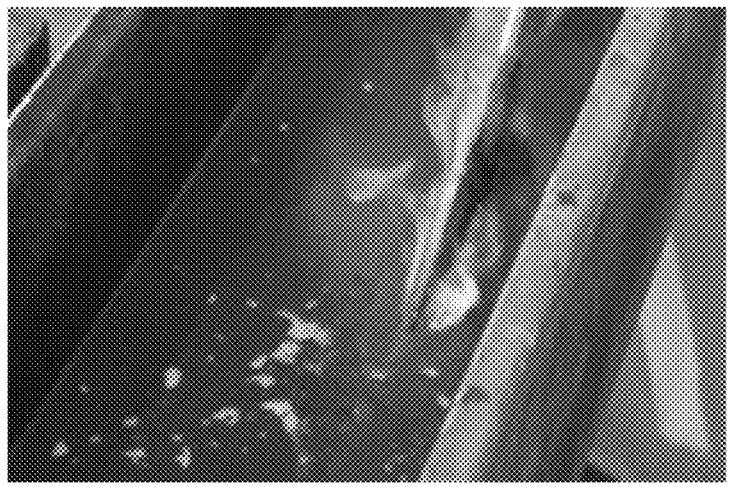
FIG. 1E, FIG. 1F, FIG. 1G and FIG. 1H are photographs showing respective steps of the process of manufacturing a kitchen knife using an iron sand ingot according to an embodiment of the present disclosure.
Figure 1F:
Figure 1G:
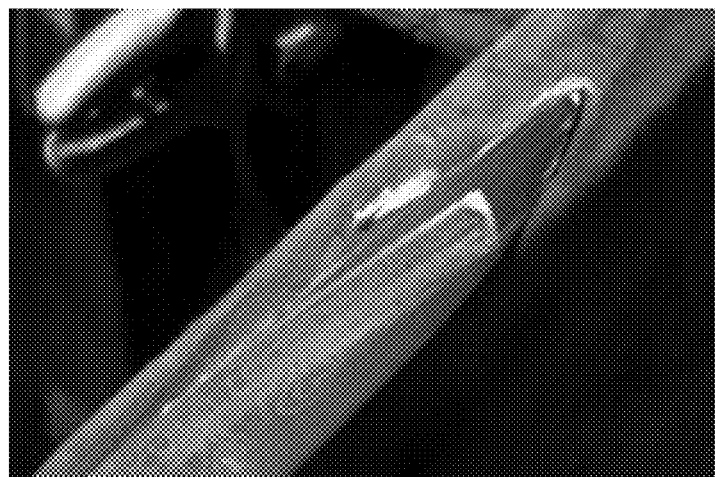
Figure 1H:
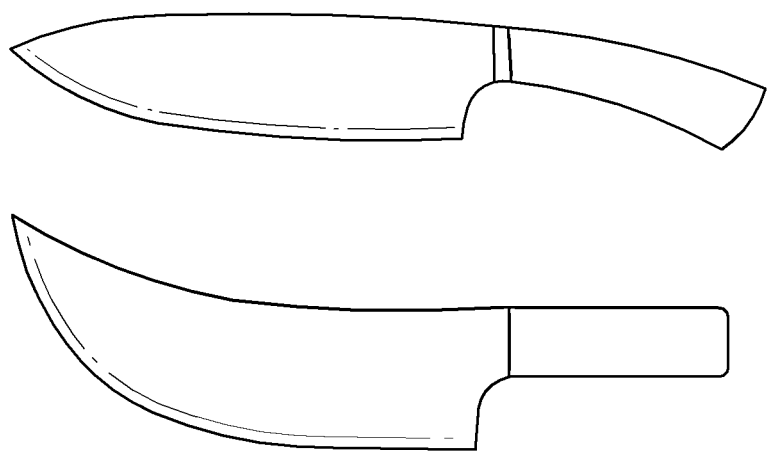

First, the produced iron ingot was reheated and struck with a hammer to form a substantially knife-shaped body. At this time, the iron ingot was tapped as much as possible to make the thickness thin (FIG. 1A). Then, the blade part was ground using a grinding machine (FIG. 1B). When the blade part was ground, mud, a mixture of kaolin and white clay in a ratio of 1:1, was applied to the entire knife body, and the mud applied to the blade part was removed in a wave pattern. This is to control the heating rate during heat treatment (FIG. 1C). Then, the knife body was loaded and heated in a smithery hearth (FIG. 1D). After the heat treatment was completed, the knife body was quenched through immersion into soy bean oil, thereby increasing the strength knife body (FIG. 1E). After the heat treatment was completed, etching was performed using an iron chloride solution (iron chloride:water=1:3) to create a pattern on the surface of the knife body (FIG. 1F). Finally, the iron ingot was micro-polished (FIG. 1G) to finally obtain a kitchen knife (hereinafter referred to as an 'iron sand ingot knife') (FIG. 1H).

Figure 2:
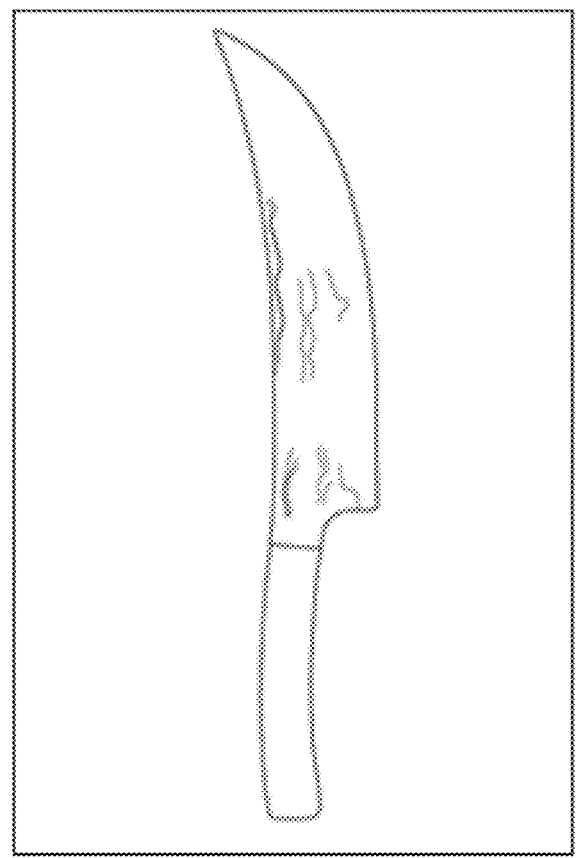
FIG. 2 illustrates the kitchen knife manufactured using the iron sand ingot according to the embodiment in side (left-side) and schematic (fight-side) views, wherein the schematic view shows the surface pattern formed on the side of a blade part of the knife.
Figure 2:
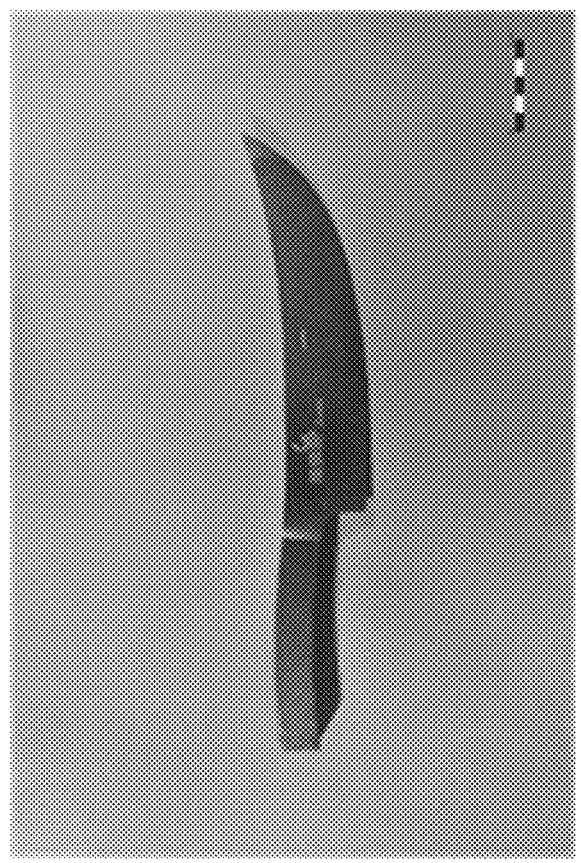

The iron sand ingot knife manufactured as described above has a wavy pattern on the surface of the blade part (see FIG. 2).

Figure 3A:
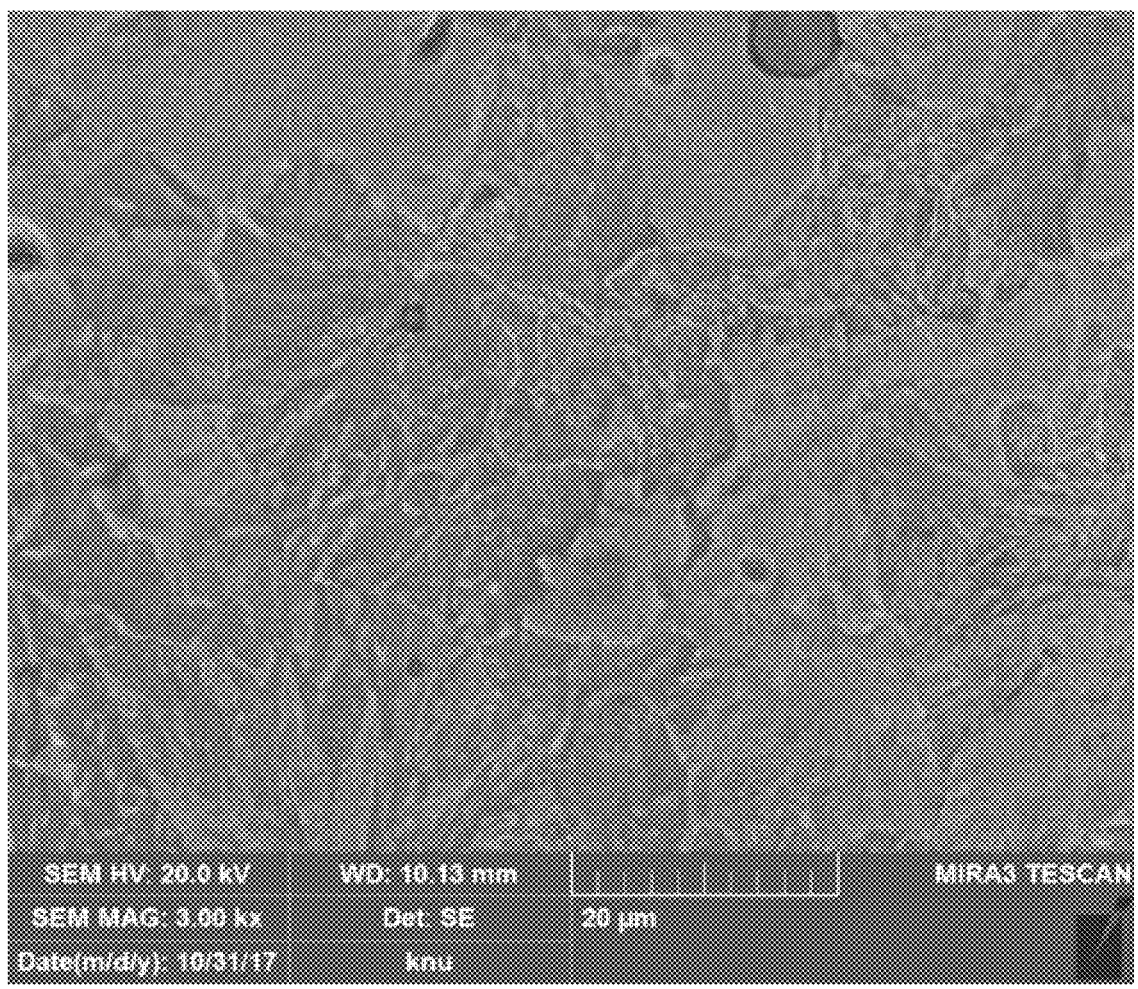
FIG. 3A.
Figure 3B:
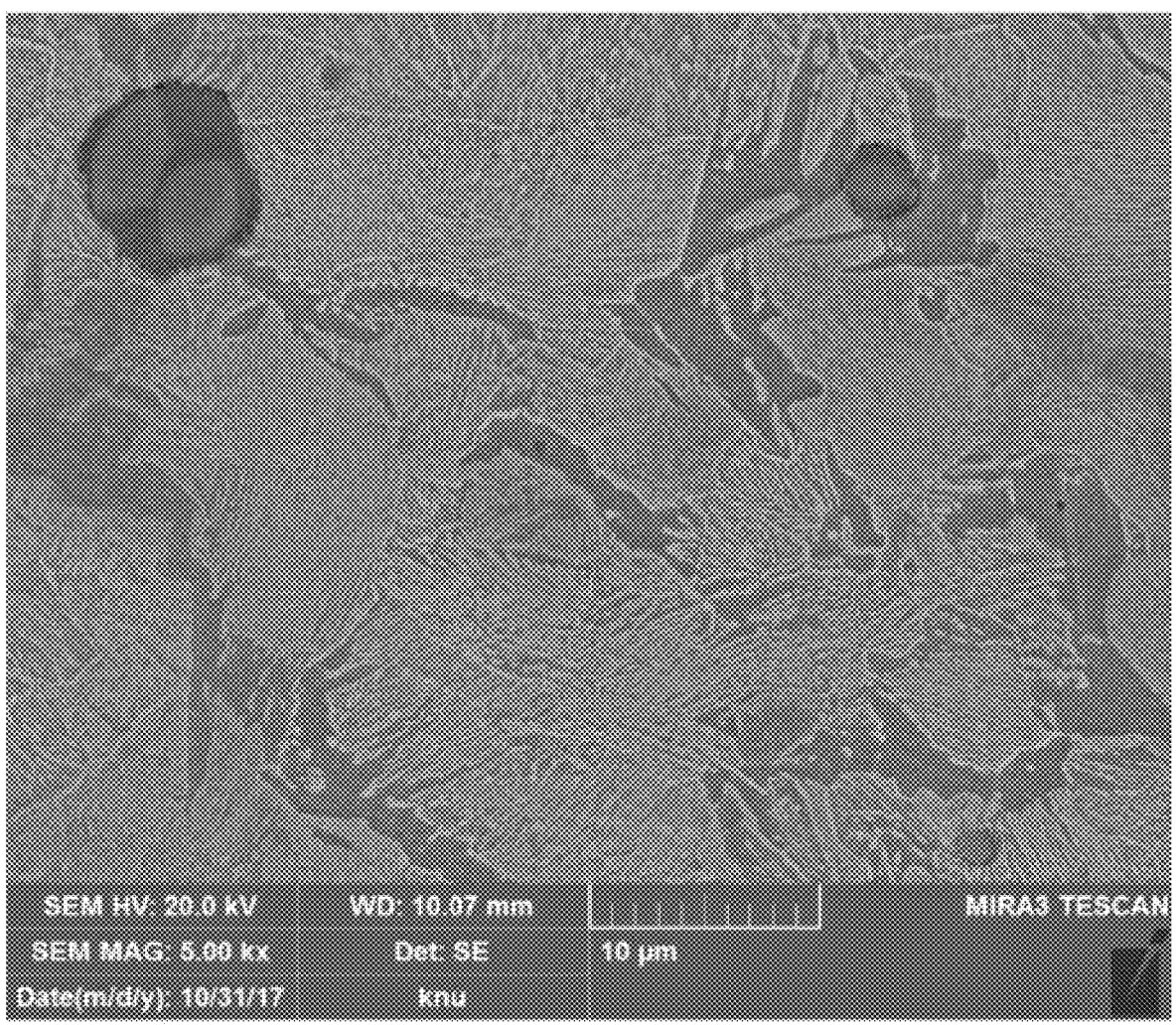
FIG. 3B and FIG. 3C are scanning electron microscope (SEM) photographs illustrating the microstructure of the blade part of the kitchen knife manufactured using the iron sand ingot according to the embodiment.
Figure 3C:
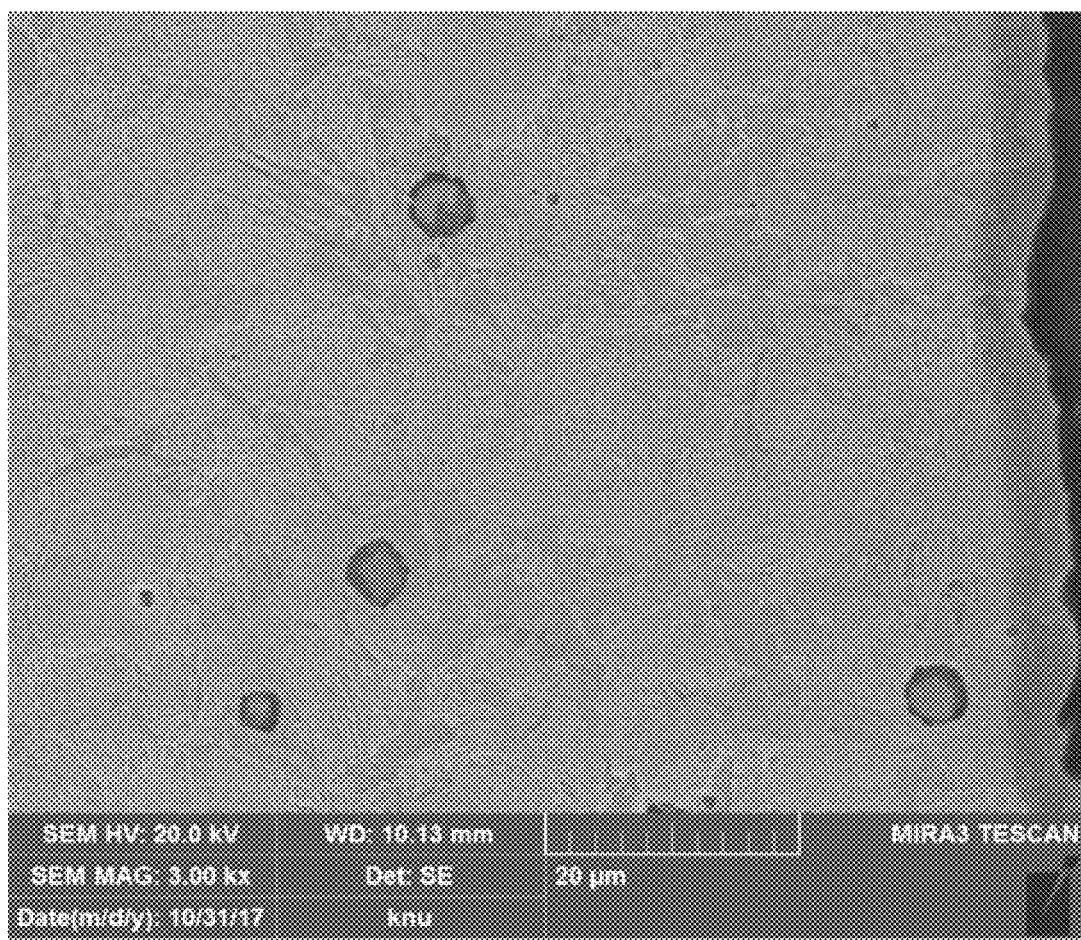

FIGS. 3A, 3B and 3C are scanning electron microscope (SEM) photographs showing the microstructure of the blade part of the kitchen knife manufactured using the iron sand ingot prepared in the present embodiment. Referring to FIGS. 3A, 3B and 3C, ferrite and pearlite were mainly observed throughout the knife. In addition, an EDS analysis result far each sample shown high FeO content, indicating that the product is pure iron. In addition, it can be seen that a significant amount of the impurities inside the knife has been removed through the process of refining and forge-welding, and that the structure has been refined due to the forge-welding.

Table 2 below shows the results of 4 times XRF measurement of the iron sand ingot used to manufacture the iron sand ingot knife according to the embodiment of the present disclosure According to the results, it can be seen that the Fe content exceeded 97.98 wt % and a small amount of elements such as Al was detected. Accordingly, it can be seen that the kitchen knife manufactured using the iron sand ingot prepared in the present embodiment is a pure iron product having a high Fe content.

TABLE 2

| Chemical compostion (wt %) | | | | | | | | |
|---|---|---|---|---|---|---|---|---|
| Al | Si | P | Ti | Cr | Mn | Fe | Zr | Pb |
| 1 | — | — | — | — | 0.03 | 0.05 | 99.88 | — | 0.03 |
| 2 | 1.35 | 1.95 | 0.1 | 0.08 | — | 0.11 | 96.41 | — | — |
| 3 | 0.85 | 1.43 | 0.11 | 0.12 | — | 0.23 | 97.24 | 0.01 | — |
| 4 | — | 1.38 | — | 0.05 | — | 0.16 | 98.41 | — | — |
| | 1.1 | 1.587 | 0.105 | 0.083 | 0.03 | 0.138 | 97.98 | 0.01 | 0.03 |

Table 3 below shows a result of measuring the Vickers hardness at three different points of the blade part of the kitchen knife manufactured using the iron sand ingot prepared in the present embodiment. The result showed high average hardness value of 278.60.

TABLE 3

| | Iron sand ingot knife | | Measurement |
|---|---|---|---|
| | HV | Load (gf) | point |
| Point 1 | 286.48 | 50 |  |
| Point 2 | 290.2 | | |
| Point 3 | 259.13 | | |
| Avg. | 278.60 | | |

The measurement results of the carbon content and the sulfur content in the knife part of the kitchen knife manufactured in this embodiment are shown in Table 4 below, wherein the average carbon content was 0.49 wt %.

TABLE 4

| Chemical composition (wt %) | | |
|---|---|---|
| | Sample 1 | |
| | Carbon | Sulfer |
| $1^{st}$ measurement | 0.488 | 0.02 |
| $2^{nd}$ measurement | 0.505 | 0.003 |
| $3^{rd}$ measurement | 0.503 | 0.003 |
| Avg. | 0.499 | 0.003 |

Table 5 shows the wear measurement results using the Rubbing Test (horizontally reciprocating wear test, KS D8314), wherein as a result of measuring wear of the blade part of the kitchen knife manufactured in the present embodiment the mass reduction rate was decreased to an average of 0.307%.

TABLE 5

| Sample name | Run | Mass before test (g) | Mass after test (g) | Mass reduction (g) | Mass reduction rate (%) |
|---|---|---|---|---|---|
| Iron sand ingot kitchen knife | 1 | 18.587 | 18.534 | 0.0533 | 0.287 |
| | 2 | 19.168 | 19.123 | 0.0449 | 0.234 |
| | 3 | 12.830 | 12.778 | 0.0514 | 0.401 |
| | Avg. | — | — | — | 0.307 |

According to the present disclosure, the knife is manufactured by performing the processes, such as gorging, grinding, quenching, etching, and the like, on the multilayer material obtained by repeating the refining and forge-welding processes of iron sand ingots from an iron sand source, thereby providing remarkably improved hardness, a long lasting cutting property, and excellent durability, compared to a conventional knife made of stainless steel.

In addition, the knife manufactured using the multilayer material obtained from iron sand according to the present disclosure has a beautiful wave pattern, like so called a Damascus knife, and also has a beautiful surface obtained by an additional surface etching process to bring out aesthetics to the user.

Although the embodiments of the present disclosure have been disclosed with reference to the accompanying drawings, those skilled in the art will appreciate that the present disclosure can be implemented in a variety of different forms without departing from the technical scope and essential features of the present disclosure. Therefore, it should be understood that the embodiments described above are illustrative in all aspects and are not intended to limiting.

The present method is applicable to the manufacture of the high quality kitchen knife using the multilayer material having remarkably improved hardness, a long lasting cutting property, and excellent durability, as well as beautiful wavy pattern and fine surface obtained through the surface etching process, compared to a conventional knife made of stainless steel.

What is claimed is:

1. A method of manufacturing a knife using a multilayer material, the method comprising:
    preparing a multilayer material for manufacturing a knife;
    heating and then forging the multilayer material to form a knife-shaped structure including a blade part and a handle part;
    grinding the blade part to form a sharpened knife-edge;
    applying mud, including kaolin and white clay, to an entire surface of the knife-shaped structure and removing the mud applied to the blade part;
    heating the knife-shaped structure applied with the mud, and quenching the heated knife-shaped structure through oil-cooling;
    etching a surface of the quenched knife-shaped structure to form a pattern on the surface; and
    grinding the surface-etched knife-shaped structure to form a knife having a final shape.

2. The method according to claim 1, wherein the preparing comprises:
    (a-1) heating wrought iron obtained by refining iron sand in a smithery hearth;
    (a-2) forging the heated wrought iron to form an iron sand ingot;
    (a-3) coating an outer surface of the iron sand ingot with charcoal and red clay;
    (a-4) heating the coated iron sand ingot, stacking the iron sand ingot along a longitudinal direction, and forge-welding the stacked iron sand ingot to form forge-welded iron sand ingot; and
    (a-5) coating, two more times, outer surfaces of the forge-welded iron sand ingot with the charcoal and red clay, heating the coated forge-welded iron sand ingot, stacking the forge-welded iron sand ingot along the longitudinal direction, and forge-welding the stacked iron sand ingot.

3. The method according to claim 2, wherein in (a-1), the iron sand mainly comprises: 85 wt % to 95 wt % of iron oxide (FeO); 3 wt % to 7 wt % of silica ($SiO_2$); 2 wt % to 4 wt % of aluminum oxide ($Al_2O_3$); 0.1 wt % to 0.5 wt % of calcium oxide (CaO); 0.1 wt % to 0.5 wt % of manganese oxide (MnO); 0.4 wt % to 0.7 wt % of titanium dioxide ($TiO_2$); and 0.2 wt % to 0.5 wt % of vanadium oxide ($V_2O_5$).

4. The method according to claim 2, wherein (a-4) and (a-5) are performed in a smithery hearth at 1250° C.

5. The method according to claim 2, wherein (a-5) is performed 11 times.

6. The method according to claim 1, wherein the mud comprises kaolin and white clay in a weight ratio of 1:1.

7. The method according to claim 1, wherein the etching comprises immersing the quenched knife-shaped structure in an aqueous solution of iron chloride ($FeCl_3$) for etching.

* * * * *